US009619863B2

(12) United States Patent
Muninder et al.

(10) Patent No.: US 9,619,863 B2
(45) Date of Patent: Apr. 11, 2017

(54) METHOD, APPARATUS AND COMPUTER PROGRAM PRODUCT FOR GENERATING PANORAMA IMAGES

(71) Applicant: Nokia Technologies Oy, Espoo (FI)

(72) Inventors: Veldandi Muninder, Bangalore (IN); Basavaraja S V, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/395,962

(22) PCT Filed: Apr. 5, 2013

(86) PCT No.: PCT/FI2013/050367
§ 371 (c)(1),
(2) Date: Oct. 21, 2014

(87) PCT Pub. No.: WO2013/160533
PCT Pub. Date: Oct. 31, 2013

(65) Prior Publication Data
US 2015/0131909 A1 May 14, 2015

(30) Foreign Application Priority Data

Apr. 25, 2012 (IN) .......................... 1632/CHE/2012

(51) Int. Cl.
G06K 9/46 (2006.01)
G06T 3/40 (2006.01)
(Continued)

(52) U.S. Cl.
CPC .......... G06T 3/4038 (2013.01); G06K 9/4609 (2013.01); G06T 3/0068 (2013.01); H04N 5/23238 (2013.01); G06T 2200/32 (2013.01)

(58) Field of Classification Search
CPC . G06T 3/4038; G06T 3/0068; G06T 2200/32; G06K 9/4609; H04N 5/23238
(Continued)

(56) References Cited

U.S. PATENT DOCUMENTS 6,097,854 A 8/2000 Szeliski et al.
2009/0285544 A1* 11/2009 Fitzgibbon ............ G06T 7/2033
386/278
2011/0262015 A1 10/2011 Ishikawa et al.

FOREIGN PATENT DOCUMENTS

JP 3104327 B2 10/2000

OTHER PUBLICATIONS

International Search Report and Written Opinion received for corresponding Patent Cooperation Treaty Application No. PCT/FI2013/050367, mailed Oct. 28, 2013, 11 pages.
(Continued)

Primary Examiner — Ruiping Li
(74) Attorney, Agent, or Firm — Alston & Bird LLP

(57) ABSTRACT

In accordance with an example embodiment a method, apparatus and computer program product are provided. The method comprise assigning weights to at least one first feature and at least one second feature. The at least one first feature may be associated with a first image and the at least one second feature may be associated with a second image. The weights are assigned based on a distance of the at least one first feature and the at least one second feature from a central portion of the corresponding one of the first image and the second image. The method further includes registering the first image and the second image based at least on the assigned weights to determine transforms between the first image and the second image. The first image and the second image may be based on the determined transform.

21 Claims, 7 Drawing Sheets

(51) Int. Cl.
   *H04N 5/232* (2006.01)
   *G06T 3/00* (2006.01)
(58) Field of Classification Search
   USPC .................................................. 382/284, 190
   See application file for complete search history.

(56) References Cited

OTHER PUBLICATIONS

Brown, M et al., Automatic Panoramic Image Stitching using Invariant Features, International Journal of Computer Vision, 2007, vol. 74, pp. 59-73. [online], [retrieved on Oct. 25, 2013]. Retrieved from the Internet <URL: http://link.springer.com/article/10.1007%2Fs11263-006-0002-3#> <DOI:10.1007/s11263-006-0002-3> pp. 6, col. 2, para. 1.
Extended European Search Report for corresponding European Application No. 13781210.3 dated Nov. 19, 2015, 8 pages.
Dornaika, F. et al., *Image Registration for Foveated Panoramic Sensing*, ACM Transactions on Multimedia Computing, Communications and Applications, vol. 8, No. 2, (May 2012).
Gao J. et al., *Constructing Image Panoramas using Dual-Homography Warping*, Computer Vision and Pattern Recognition, 2011 IEEE [online][retrieved Dec. 8, 2015]. Retrieved from the Internet: <URL: https://www.comp.nus.edu.sg/~brown/pdf/cvpr_dualhomography2011.pdf >. 8 pages.
*Harris affine region detector—Wikipedia, the free encyclopedia* [online] [retrieved Dec. 8, 2015]. Retrieved via the Internet Archive Wayback Machine at <URL: https://web.archive.org/web/20141021043552/http://en.wikipedia.org/wiki/Harris_affine_region_detector> (Sep. 16, 2014) 15 pages.
Heckbert, Paul, *Projective Mappings for Image Warping*, 15-869, Image-Based Modeling and Rendering, (Sep. 13, 1999) 1-5.
Lin, W.-Y. et al., *Smoothly Varying Affine Stitching*, Computer Vision and Pattern Recognition, 2011 IEEE [online] [retrieved Dec. 8, 2015]. Retrieved from the Internet: <URL: https://www.ece.nus.edu.sg/stfpage/eleclf/Lin_CVPR11.pdf>. 13 pages.
Szeliski, R. et al., *Creating Full View Panoramic Image Mosaics and Environment Maps*, Association for Computing Machinery, Inc. (1997) 8 pages.
Szeliski, Richard, *Image Alignment and Stitching: A Tutorial*, Technical Report MSR-TR-2004-92, Microsoft Research (Dec. 10, 2006) 1-87.
Zorin, D. et al., *Correction of Geometric Perceptual Distortions in Pictures*, Proceedings of the $22^{nd}$ Annual Conference on Computer Graphics and Interactive Techniques, ACM (1995) 257-264.

\* cited by examiner

FIGURE 9
FIGURE 8
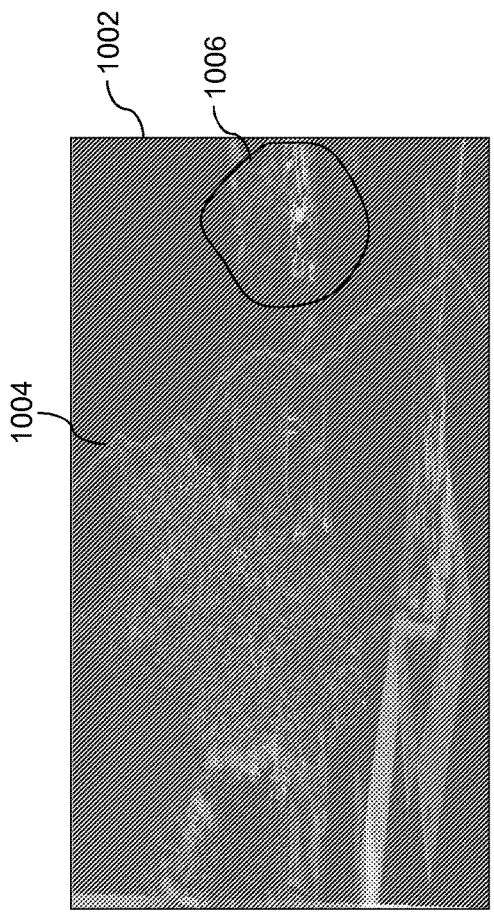
FIGURE 10

METHOD, APPARATUS AND COMPUTER PROGRAM PRODUCT FOR GENERATING PANORAMA IMAGES

This application was originally filed as PCT Application No. PCT/FI2013/050367 filed Apr. 5,2013 which claims priority to Indian Patent Application No. 1632/CHE/2012 filed Apr. 25,2012.

TECHNICAL FIELD

Various implementations relate generally to method, apparatus, and computer program product for generating panorama images.

BACKGROUND

Panorama image refers to an image captured with an extended field of view in one or more directions (for example, horizontally or vertically). The extended field of view is a wide-angle representation beyond that captured by an image sensor. For example, an image that presents a field of view approaching or greater than that of the human eye can be termed as a panorama image. Various devices like mobile phones and personal digital assistants (PDA) are now being increasingly configured with panorama image/video capture tools, such as a camera, thereby facilitating easy capture of the panorama images/videos.

Such devices generate a high quality panorama image by capturing a sequence of images related to the scene, where these images may have some overlapping regions between them. The captured images are ordered and stitched together to generate the panorama image.

SUMMARY OF SOME EMBODIMENTS

Various aspects of examples of examples embodiments are set out in the claims.

In a first aspect, there is provided a method comprising: assigning weights to at least one first feature and at least one second feature, the at least one first feature being associated with a first image and the at least one second feature being associated with a second image, the weights being assigned based on a distance of the at least one first feature and the at least one second feature from a central portion of the corresponding one of the first image and the second image; registering the first image and the second image based at least on the assigned weights to determine transforms between the first image and the second image; and transforming the first image and the second image based on the determined transform.

In a second aspect, there is provided an apparatus comprising at least one processor; and at least one memory comprising computer program code, the at least one memory and the computer program code configured to, with the at least one processor, cause the apparatus to perform at least: assigning weights to at least one first feature and at least one second feature, the at least one first feature being associated with a first image and the at least one second feature being associated with a second image, the weights being assigned based on a distance of the at least one first feature and the at least one second feature from a central portion of the corresponding one of the first image and the second image; registering the first image and the second image based at least on the assigned weights to determine transforms between the first image and the second image; and transforming the first image and the second image based on the determined transform.

In a third aspect, there is provided a computer program product comprising at least one computer-readable storage medium, the computer-readable storage medium comprising a set of instructions, which, when executed by one or more processors, cause an apparatus to perform at least: assigning weights to at least one first feature and at least one second feature, the at least one first feature being associated with a first image and the at least one second feature being associated with a second image, the weights being assigned based on a distance of the at least one first feature and the at least one second feature from a central portion of the corresponding one of the first image and the second image; registering the first image and the second image based at least on the assigned weights to determine transforms between the first image and the second image; and transforming the first image and the second image based on the determined transform.

In a fourth aspect, there is provided an apparatus comprising: means for assigning weights to at least one first feature and at least one second feature, the at least one first feature being associated with a first image and the at least one second feature being associated with a second image, the weights being assigned based on a distance of the at least one first feature and the at least one second feature from a central portion of the corresponding one of the first image and the second image; means for registering the first image and the second image based at least on the assigned weights to determine transforms between the first image and the second image; and means for transforming the first image and the second image based on the determined transform.

In a fifth aspect, there is provided a computer program comprising program instructions which when executed by an apparatus, cause the apparatus to: assign weights to at least one first feature and at least one second feature, the at least one first feature being associated with a first image and the at least one second feature being associated with a second image, the weights being assigned based on a distance of the at least one first feature and the at least one second feature from a central portion of the corresponding one of the first image and the second image; register the first image and the second image based at least on the assigned weights to determine transforms between the first image and the second image; and transform the first image and the second image based on the determined transform.

BRIEF DESCRIPTION OF THE FIGURES

Various embodiments are illustrated by way of example, and not by way of limitation, in the figures of the accompanying drawings in which:

FIG. 8 illustrates a panorama image being generated in accordance with another example embodiment;

FIG. 9 illustrates distribution of inliers for various panorama images being generated in accordance with an example embodiment; and FIG. 10 illustrates an error distribution for a panorama image in accordance with an example embodiment.

DETAILED DESCRIPTION

Example embodiments and their potential effects are understood by referring to FIGS. 1 through 13b of the drawings.

Figure 1:
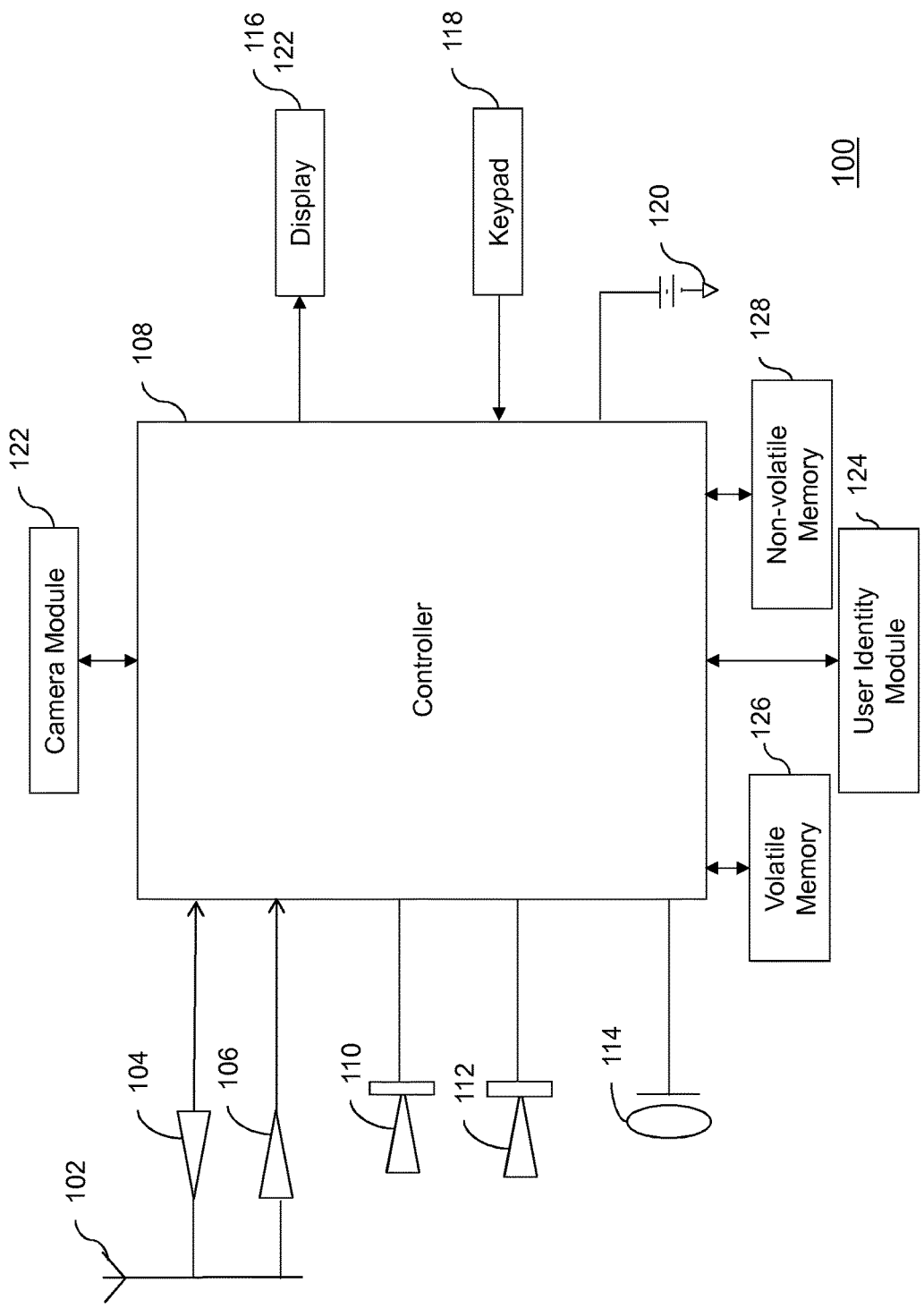
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
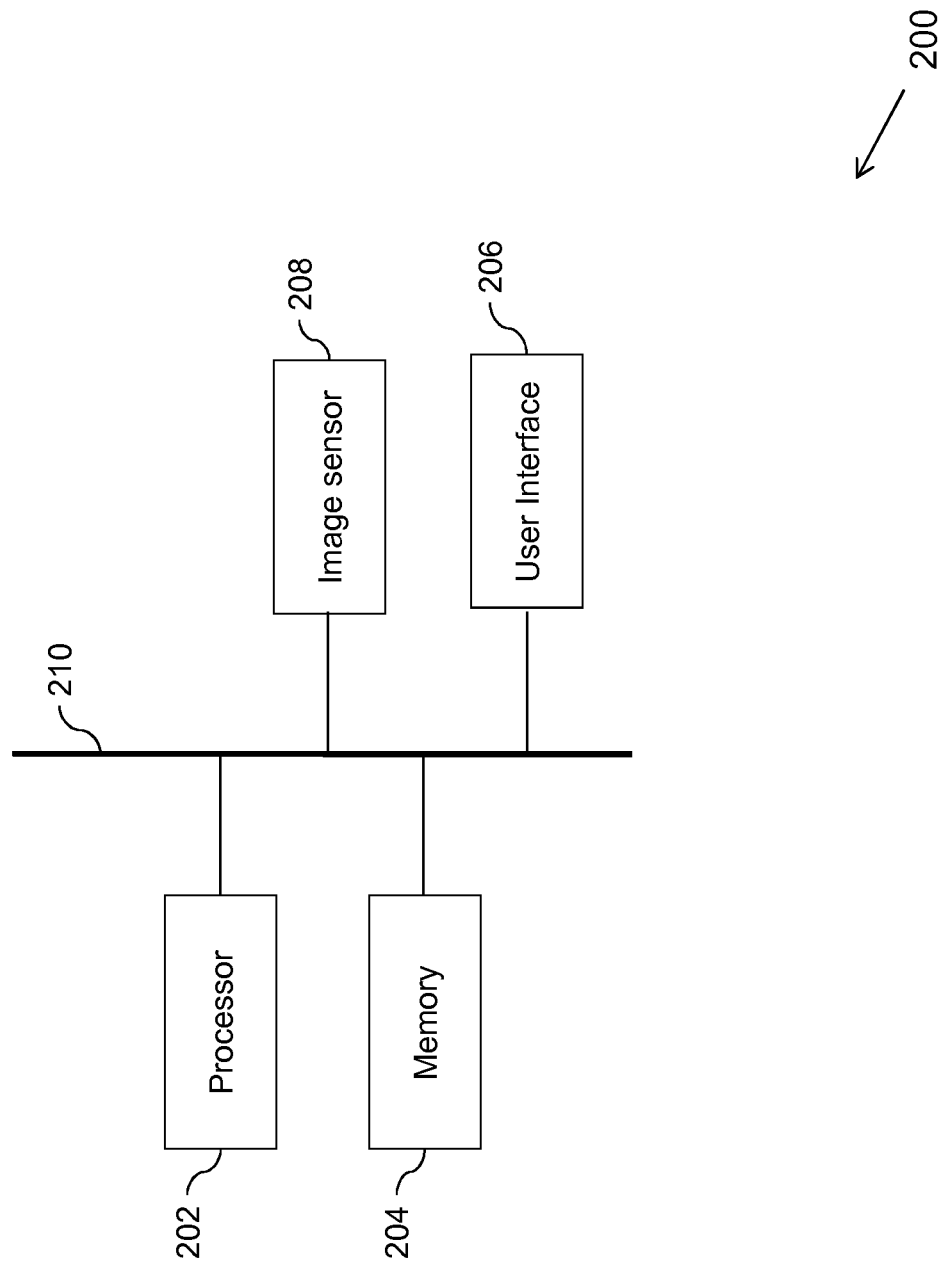
FIG. 2 illustrates an apparatus for generating panorama images in accordance with an example embodiment.

FIG. 2 illustrates an apparatus 200 for generating panorama images, in accordance with an example embodiment. The apparatus 200 may be employed for estimating image parameters, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like.

Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of media content may include audio content, video content, data, and a combination thereof.

In an example embodiment, the electronic may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100.

These components (202-208) may communicate to each other via a centralized circuit system 210 to perform estimation/computation of image parameters. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 200 is configured to, with the content of the memory 204, and optionally with other components described herein, to cause the apparatus 200 to facilitate access images associated with a scene for generating a panorama image of a scene. As described herein, the term 'panorama image' refers to images associated with a wider or elongated field of view. Panoramic image may include a two-dimensional construction of a three-dimensional scene. In some embodiments, the panorama image may provide about 360 degrees view of the scene. The panorama image can be generated by capturing a video footage or multiple still images of the scene, as a multimedia capturing device (for example, a camera) is spanned through a range of angles.

In some embodiments, the generation of a panorama image involves various processes, for example, image acquisition, image registration and image merging/blending. In some embodiments, the image acquisition may be performed by an image capturing device, for example, a camera. In an embodiment, during image acquisition, the multimedia content associated with the scene may be captured by displacing the apparatus 200 in at least one direction. In an example embodiment, the camera may be moved around the scene either from left direction to right direction, or from right direction to left direction, or from top direction to a bottom direction, or from bottom direction to top direction, and so on. In an embodiment, the apparatus 200 may be an example of a media capturing device, for example, a camera. In some embodiments, the apparatus 200 may include a position sensor for determining direction of movement of the apparatus 200 for capturing the multimedia content. In some embodiments, the multimedia content may comprise images of one or more objects captured at different times. In certain other embodiments, the multimedia content may comprise a video content, such as a short movie, recording of an event or movie, and the like.

In various example embodiments, the scene may include one or more objects, which may be captured by image sensors such as the image sensor 208. In an example embodiment, the apparatus 200 is caused to facilitating receipt of a plurality of images and the image data by capturing the plurality of images and plurality of image data by one or more image sensors such as the image sensor 208. In an example embodiment, the plurality of images may be captured in an arbitrary direction to capture the scene. It is noted that each image may correspond to at least a portion of the scene such that the adjacent images, for example, the first image and the second image of the plurality of images may be used to generate the panorama image of the scene.

In an embodiment, the multimedia content, for example the images may be prerecorded and stored in the apparatus, for example the apparatus 200. In another embodiment, the multimedia content may be captured by utilizing the device, and stored in the memory of the device. In yet another embodiment, the device 100 may receive the multimedia content from internal memory such as hard drive, random access memory (RAM) of the apparatus 200, or from external storage medium such as DVD, Compact Disk (CD), flash drive, memory card, or from external storage locations through Internet, Bluetooth®, and the like. The apparatus 200 may also receive the multimedia content from the memory 204.

In an example embodiment, the processor 202 is configured to, with the content of the memory 204, and optionally with other components described herein, to cause the apparatus 200 to facilitate receipt of a plurality of images associated with the scene for generating a panorama image. For instance, the apparatus is caused to receive a first image and a second image associated with a scene such that the first image and the second image includes at least an overlapping region between them. In an example embodiment, a processing means may be configured to facilitate receipt of a plurality of images, for example the first image and the second image associated with the scene for generating a panorama image. An example of the processing means may include the processor 202, which may be an example of the controller 108.

In an example embodiment, the processor 202 is configured to, with the content of the memory 204, and optionally with other components described herein, to cause the apparatus 200 to compute at least one first feature and at least one second feature associated with the first image and the second image, respectively. In an example embodiment, a processing means may be configured to compute the at least one first feature and the at least one second feature. An example of the processing means may include the processor 202, which may be an example of the controller 108.

In example embodiment, the at least one first feature and the at least one second feature may be computed based on a corner detection method. As used herein, the corner detection method includes extraction of features, for example, the at least one first feature and the at least one second feature associated with an image, for example, the first image, and inferring contents of the image based on the extracted features. In some embodiments, the term 'corner' may be defined as an intersection of two edges that may define the boundary between two different objects or the parts of a same object, for example, in an image. In an example embodiment, the corner detection method may include computing Harris corners. In this embodiment, the at least one first corner feature and the at least one second corner feature may be Harris corner features, which may be computed and arranged in a collection of local feature vectors associated with the first image and the second image respectively. Each of the feature vectors may be distinctive and invariant to any scaling, rotation and translation of the image. The feature vectors may be utilized for determining distinctive objects in different frames, for example, the frames associated with the first image and the second image.

In an example embodiment, the processor 202 is configured to, with the content of the memory 204, and optionally with other components described herein, to cause the apparatus 200 to determine a distance of the at least one first feature from a central portion of the first image, and determining a distance of the at least one second feature from a central portion of the second image. In an example embodiment, the processor 202 is configured to, with the content of the memory 204, and optionally with other components described herein, to cause the apparatus 200 to assign weights to the at least one first feature and the at least one second feature based on the distance of the at least one first feature and the at least one second feature from a corresponding central portion of the first image and the second image, respectively. In an example embodiment, the weights are assigned to the at least one first feature and the at least one second feature based on a weighting function:

$$w_x^1 = 1 - |((x-c_x)/c_x)^n| \quad (1)$$

where, x is an x-coordinate of one of the at least one first feature and the at least one second feature, $c_x$ is a central portion of one of the first image and the second image, and n is a predetermined constant. In an example embodiment, the value of n may be 0.5.

Based on the weighting function (1), the weight at the center of an image, for example, the first image and the second image is unity, and the weight decreases linearly or exponentially when a column wise distance from the central portion of the respective image is traversed. In an example embodiment, $c_x = M/2$ is the x-center of the image having M number of columns.

In an example embodiment, the processor 202 is configured to, with the content of the memory 204, and optionally with other components described herein, to cause the apparatus 200 to register the first image and the second image based at least on the assigned weights to determine transforms between the first image and the second image. In some embodiments, registering the first image with the second image includes performing feature matching between the at least one first feature and the at least one second feature to generate a plurality of matched features. For each of the plurality of matched features, a plurality of matching weights is computed based on the weights assigned to the at least one first feature and the at least one second feature. For example, if $w_i^1$ represents an $i^{th}$ feature associated with the first image, and $w_j^2$ represents a $j^{th}$ feature associated with the second image such that $i^{th}$ feature of the first image matches with the $j^{th}$ feature of the second image, then a weight associated with the matched feature between the $i^{th}$ feature of the first image and the $j^{th}$ feature of the second image may be determined based on the following expression:

$$w_{ij} = w_i^1 * w_j^2 \quad (2)$$

The expression (2) may be utilized for determining the plurality of matching weights associated with the plurality of matching features between the first image and the second image.

In an embodiment, the processor 202 is configured to, with the content of the memory 204, and optionally with other components described herein, to cause the apparatus 200 to select a set of matching features from the plurality of matching features. In an embodiment, the set of matching features is selected from the plurality of matching features based on the plurality of matching weights. Each of the set of matching features may be associated with a relatively higher weight as compared to most of the matching features. For example, if the plurality of matching features comprises K number of matching features between the first image and the second image, then the set of matching features may include top K/4 number of matched features that may have a higher matching weight $w_{ij}$. In an example embodiment, selecting the set of matching features includes sorting the plurality of matching features in an order of the matching weights associated with each of the plurality of matching features. From the plurality of matching features, those matching features are selected as the set of matching features that have a matching weight $W_{ij}$ greater than a predetermined matching weight. It should be noted that in this embodiment, Random Sample Consensus (RANSAC) method is utilized for determining the set of matching features from the plurality of matching features.

In an embodiment, the processor 202 is configured to, with the content of the memory 204, and optionally with other components described herein, to cause the apparatus 200 to estimate a plurality of transforms between various matching features associated with the set of matching features. In an embodiment, the processor 202 is further configured to, with the content of the memory 204, and optionally with other components described herein, to cause the apparatus 200 to select a transform of the plurality of transforms based on a total matching weight associated with the transform.

In an example embodiment, the total matching weight of each of the plurality of transform is determined based on a plurality of inliers associated with the transform. The term 'inlier' as used herein may refer to a set of points or data whose distribution is associated with a set of model parameters. In an embodiment, a probable transform may be computed for each of the random pairwise matching features, and an inlier is determined corresponding to each of the probable transform. In an example embodiment, the transforms determined depends on the number of pairwise matching features considered. For example, by utilizing two pairs of matching features, a similarity transform may be determined between the images. As another example, by using four pairs of matching features, a homography transform may be determined between the images.

The total matching weight associated with each of the probable transforms is computed for the determined inlier. In an example embodiment, the total matching weight for each of the transform is computed based on the following expression:

$$W_t = \sum_{i,j} (w_i^1 * w_j^2)^p$$

$W_t$ is the total matching weight associated with each transform, and p is a constant.

In an example embodiment, the value of p is 2. In the present embodiment, since the probable transforms are determined by utilizing the inliers that are selected based on the assigned weights, the inliers are primarily associated with the central portion of the overlap region between the first image and the second image. Moreover, the inliers at the peripheral regions of either the first image and the second image are discouraged. In an embodiment, the selection of inliers is configured to improve the image quality of the panorama image generated from the first image and the second image. An example panorama image illustrating the advantage of selection of the inliers is shown and described further in detail with reference to FIG. 9.

In an example embodiment, the processor 202 is configured to, with the content of the memory 204, and optionally with other components described herein, to cause the apparatus 200 to transform the first image and the second image based on the determined transform. In an embodiment, the determined transform facilitates in minimizing the distortion at the center of the overlap region between the first image and the second image, since the transforms are determined based on the weights assigned to the at least one first feature and the at least one second feature, and accordingly the determined transforms are configured to minimize the distortion at the central portion of the overlap region. For example, the transform determination may minimize only a portion, for instance, a column strip associated with a central portion of the overlap region. Since only the central portion of the overlap region is considered for the transform determination/estimation, a seam is computed over the column strip only, thereby minimizing the distortion. An example panorama image illustrating the panorama image and the seam generated for the same is illustrated and explained in detail with reference to FIG. 10.

In some embodiments, the transform is estimated such that the distortion at the central portion of the overlap region is minimized due to the weights assigned to the at least one first features and the at least one second features associated with the first image and the second image.

In an example embodiment, the apparatus 200 is caused to warp the images, for example, the first image and the second image based on the transforms. In an example embodiment, the apparatus 200 is caused to stitch the warped images to generate the panorama image. For instance, in an example embodiment, two warped images may be stitched by computing a seam between the images and blending the images across the seam. In an example embodiment, the seam between the images may be determined by a dynamic programming based seam computation method.

In some example embodiments, an apparatus such as the apparatus 200 may comprise various components such as means for assigning weights to at least one first feature and at least one second feature, means for registering the first image and the second image based at least on the assigned weights to determine transforms between the first image and the second image, and means for transforming the first image and the second image based on the determined transform. Such components may be configured by utilizing hardware, firmware and software components. Examples of such means may include, but are not limited to, the processor 202 along with the memory 204, the UI 206, and the image sensor 208.

In an example embodiment, the means for registering the first image and the second image comprises, means performing feature matching between the at least one first feature and the at least one second feature to generate a plurality of matched features, means for computing a plurality of matching weights for the plurality of matched features based on the weights assigned to the at least one first feature and the at least one second feature, means for estimating a plurality of transforms between a set of matching features of the plurality of matching features, wherein the set of matching features being selected from the plurality of matching features based on the plurality of matching weights, and means for selecting a transform of the plurality of transforms based on a total matching weight associated with the transform, wherein the total matching weight of the transform being determined based on a plurality of inliers associated with the transform. Examples of such means may include, but are not limited to, the processor 202 along with the memory 204, the UI 206, and the image sensor 208.

In an example embodiment, means for selecting the set of matching features from the plurality of matching features comprises means for sorting the plurality of matching features in a decreasing order of the matching weights associated with each of the plurality of matching features, and means for selecting the matching features of the plurality of matching features that have a matching weight greater than a predetermined matching weight as the set of matching features.

In an example embodiment, wherein means for estimating the plurality of transforms from the set of matching features comprises means for selecting random number of pairwise matching features from the set of matching features, means for computing the total matching weight for each of the selected random number of pairwise matching features, and means for determining a transform corresponding to a maximum total matching weight from the computed total matching weight, wherein the determined transform being utilized for panorama generation. Examples of such means may include, but are not limited to, the processor 202 along with the memory 204.

In an example embodiment, wherein means for determining the total matching comprises means for computing a probable transform for each of the random pairwise matching features, means for determining an inlier corresponding to each of the probable transform, and means for computing the total matching weight associated with each of the probable transforms for the determined inlier. Examples of such means may include, but are not limited to, the processor 202 that may be an example of the controller 108, alongwith the memory 204. Some embodiments of panorama generation are further described in FIGS. 3 to 10.

Figure 3:
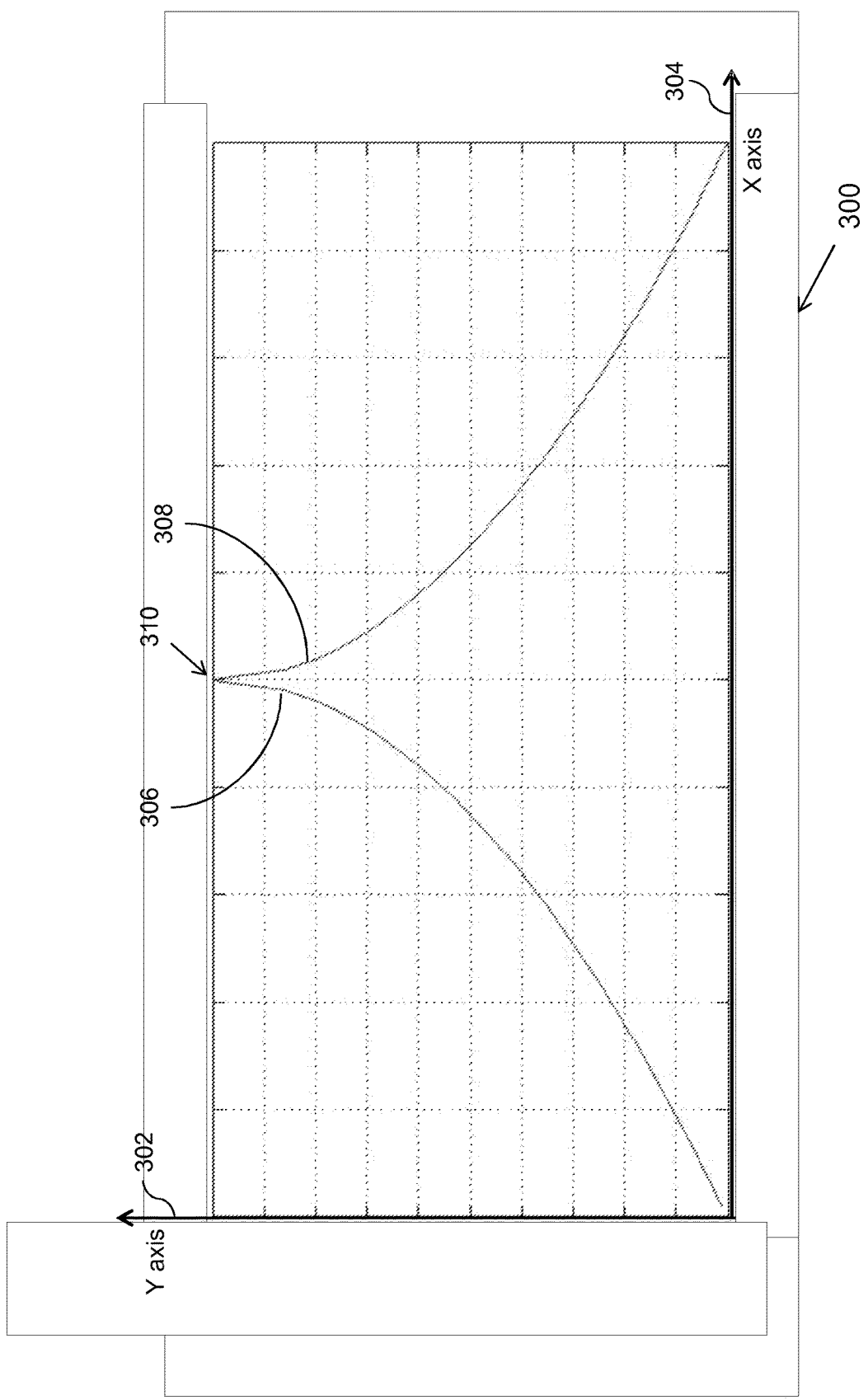
FIG. 3 illustrates a variation of weights assigned to image features with a distance from a central portion of image, in accordance with an example embodiment.

FIG. 3 illustrates a plot 300 showing variation of weights assigned (plotted on Y-axis 302) to image features with a distance (plotted on X-axis 304) from a central portion of image, in accordance with an example embodiment. In some embodiments, the weights may be assigned to image features, for example, the at least one first feature and the at least second feature associated with the first image and the second image.

As discussed with reference to FIG. 2, when images are captured by utilizing, for example, a wide angle camera, the objects appearing in the central portion of the image replicates the original objects while the objects appearing towards the corner portions of the image looks distorted. In some embodiments, upon traversing from the central portion of the image towards the corner portions or edges, the distortion of the images may increase.

In some embodiments, if two or more images are utilized for generating a panorama image, image features associated with each of the images are determined and weights may be assigned to the each of the image features. In some embodiments, the weights may be assigned based on a distance of the image feature from the central portion of the corresponding image. As can be seen from the plot, the weights assigned to the image features increase as the image is traversed from an edge portion of the image towards a central portion of the image (as illustrated by a portion 306 of the curve) is traversed, while the weights assigned to the image features decrease as the image is traversed from the central portion of the image towards the edge portion of the image (as illustrated by a portion 308 of the curve) is traversed. In an example embodiment, the weight assigned to image features at the central portion of the image may be unity or maximum (as illustrated by an arrow marked 310), while the weights assigned may be decreased while moving away from the central portion of the image. In an example embodiment, the weights may be assigned to the image features based on the expression (1), as discussed with reference to FIG. 2.

In some embodiments, assigning weights based on the distance of the image feature from the central portion of the image has the advantage that the image features closer to the central portion of the image may be assigned relatively higher weights as compared to the image features that are relatively away from the central portion of the image. The assigned weights are utilized for determining transforms associated with the first image and the second image. In some embodiments, the transforms determined based on the assigned weights facilitates in minimizing the distortion at the central portion of the overlap region between the images, for example the first image and the second image.

Figure 4:
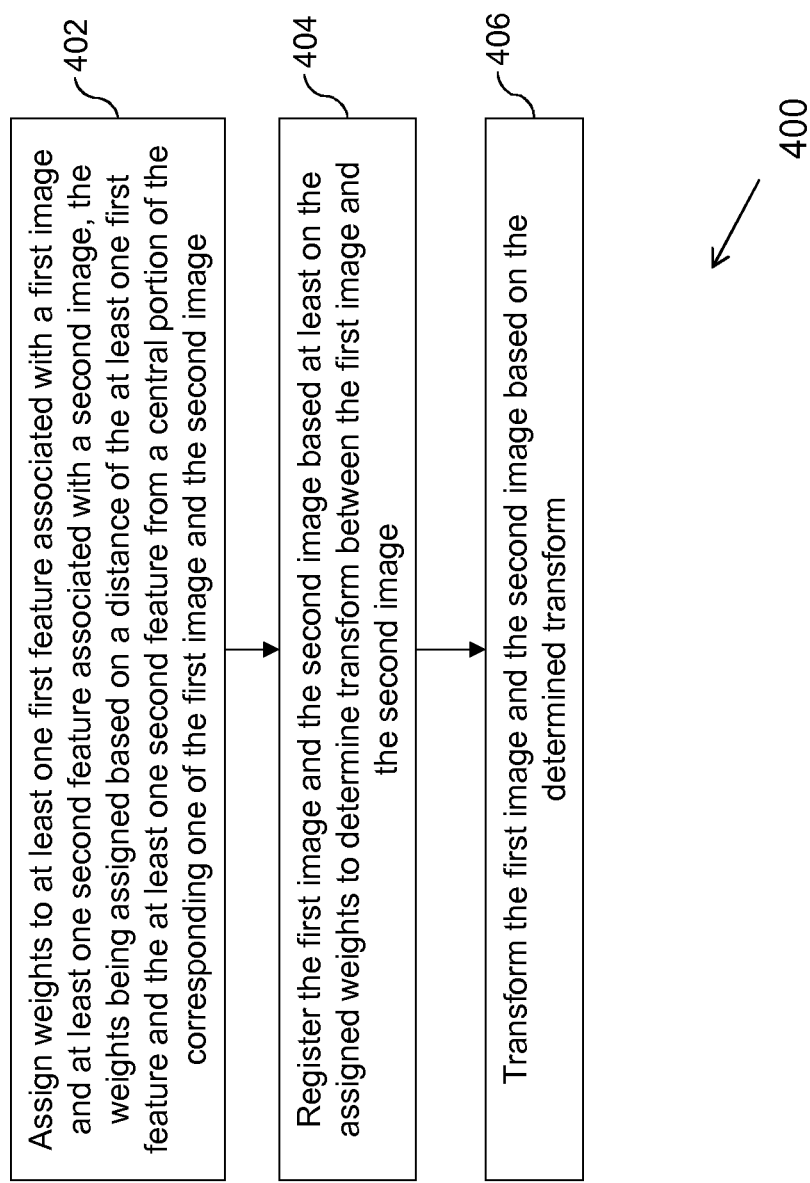
FIG. 4 is a flowchart depicting an example method for generating panorama images in accordance with an example embodiment.

FIG. 4 is a flowchart depicting an example method 400 for generating panorama image, in accordance with an example embodiment. The method 400 depicted in the flow chart may be executed by, for example, the apparatus 200 of FIG. 2. In some embodiments the panorama image may be generated by combining a plurality of images, In some embodiments, the plurality of images may be captured by an image capturing device, or may be retrieved from a memory of a device, for example, the device 100 (refer to FIG. 1) for generating the panorama image.

In an example embodiment, the plurality of images may be associated with a scene, such that each of the plurality of images may correspond to at least a portion of the scene. As disclosed herein, the plurality of images may include adjacent images such that any two adjacent images of the plurality of images may include a common portion or an overlapping region. For example, the plurality of images may include a first image and a second image having an overlapping region between them. As disclosed herein, the terms 'first image' and 'second image' refers to successive (or adjacent) images associated with a scene, such that the first image and the second image comprises at least an overlapping region. An example illustrating the first image and the second image is illustrated and described in detail with reference to FIG. 6. It is noted that in various embodiments, the second image may succeed the first image, and vice-versa. Also, it will be contemplated that for the generation of the panorama image, the plurality of images may be input, and each image of the plurality of images may be stitched with at least one of a succeeding image and a preceding image by utilizing the method disclosed herein.

In some embodiments, the plurality of images, for example the first image and the second image may be associated with image features, for example, at least one first feature and at least one second feature, respectively. At block 402, the method 400 includes assigning weights to the at least one first feature and at least one second feature. In some embodiments, the weights are assigned based on a distance of the at least one first feature and the at least one second feature from a central portion of the corresponding one of the first image and the second image. As discussed with reference to FIGS. 2 and 3, the assignment of weights based on the distance of the image features has the advantage of reducing the distortion of the image at a central portion of the overlap region. In an example embodiment, the weights may be assigned based on the following expression:

$$w_f^i = 1 - |((f-c)/c)^n|$$

At block 404, the method includes registering the first image and the second image based at least on the assigned weights to determine transforms between the first image and the second image. In an embodiment, registering the first image and the second image includes performing feature matching between the at least one first feature and the at least one second feature to generate a plurality of matched features. Also, corresponding to the plurality of matched features, a plurality of matching weights is computed based on the weights assigned to the at least one first feature and the at least one second feature. In an embodiment, a plurality of transforms is estimated between a set of matching features of the plurality of matching features. In an example embodiment, the set of matching features is selected from the plurality of matching features based on the plurality of matching weights. In some embodiments, a transform is selected from the plurality of transforms. In an example embodiment, the transform is selected based on a RANSAC method, as described in FIG. 2.

At block 406, the method includes transforming the first image and the second image based on the determined transform. In various embodiment, the transformed first image and the second image may be blended for generating the panorama image. Various example embodiments of generation of the panorama image are described in FIG. 5.

As disclosed herein with reference to FIG. 4, the method for generation of panorama image is explained by utilizing two images, for example, the first image and the second image. However, it will be contemplated that a panorama image of more than two images may be generated based on the method 400. For example, for more than two images, each image may be stitched with a successive image or a preceding image by utilizing the method 400. For instance, weights may be assigned to at least one feature associated with each of the adjacent images of the plurality of images, wherein the weights may be assigned based on a distance of the at least one feature from a central portion of the corresponding image. Also, the plurality of images may be registered based at least on the assigned weights to determine transforms between each image and an adjacent (preceding or succeeding) image. Each of the image and the corresponding adjacent image may be transformed based on the determined transform to generate the panorama image.

In an example embodiment, a processing means may be configured to perform some or all of: assigning weights to at least one first feature and at least one second feature, the at least one first feature being associated with a first image and the at least one second feature being associated with a second image, the weights being assigned based on a distance of the at least one first feature and the at least one second feature from a central portion of the corresponding one of the first image and the second image; registering the first image and the second image based at least on the assigned weights to determine transforms between the first image and the second image; and transforming the first image and the second image based on the determined transform. An example of the processing means may include the processor 202, which may be an example of the controller 108.

Figure 5:
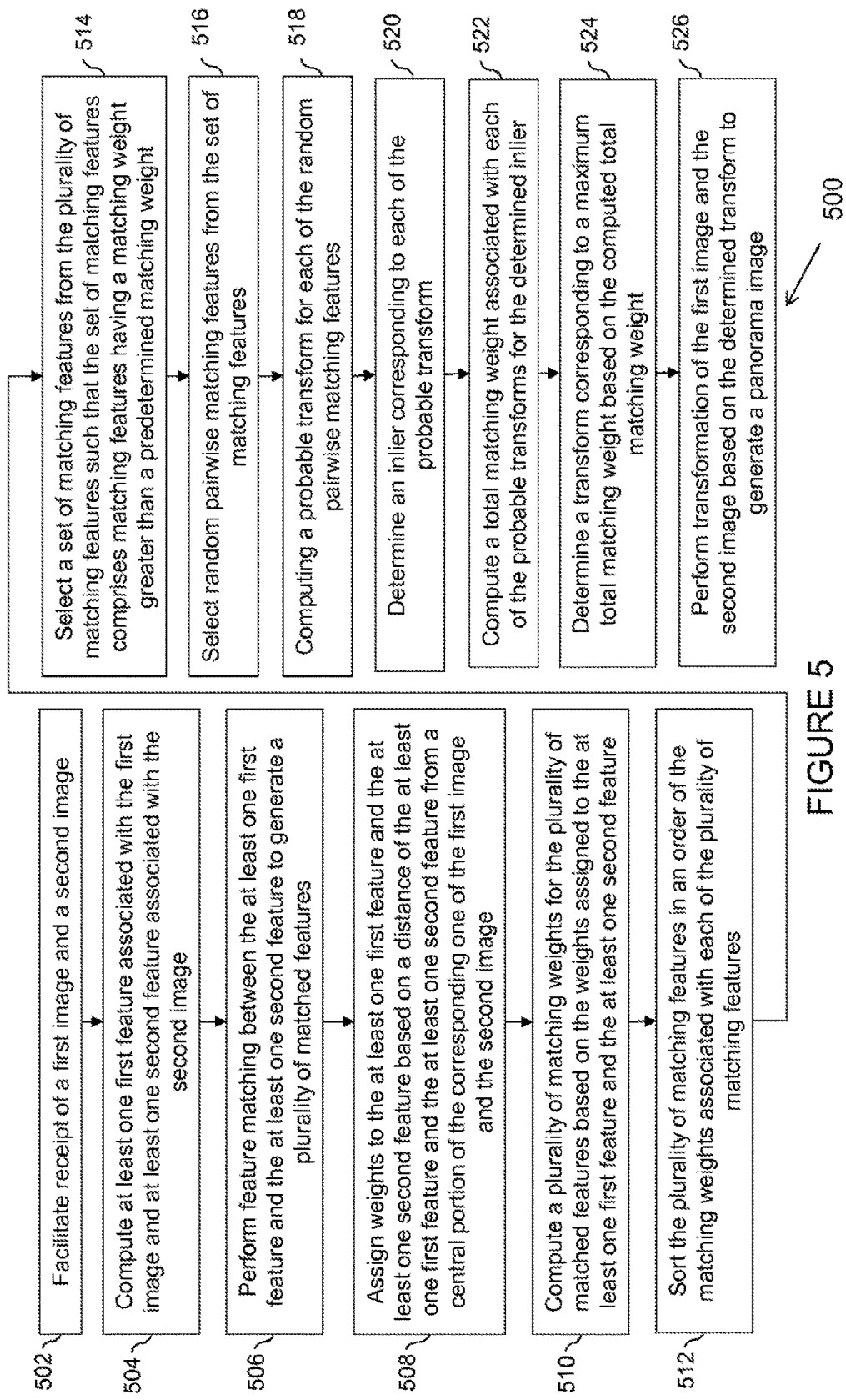
FIG. 5 is a flowchart depicting an example method for generating panorama images in accordance with another example embodiment.

FIG. 5 is a flowchart depicting example method 500 for generation of panorama images, in accordance with another example embodiment. The methods 500 depicted in the flowchart may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described. In some embodiments may be embodied by computer program instructions. In an example embodiment, the computer program instructions, which embody the procedures, described. In some embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 500 are described with help of apparatus 200. However, the operations of the method 500 can be described and/or practiced by using any other apparatus.

Referring now to FIG. 5, at block 502, the method 500 includes facilitating receipt of a plurality of images, for example a first image and a second image. In an example embodiment, the first image and the second image may be associated with a scene. In an example embodiment, each of the plurality of images may be associated with at least a portion of the scene. In some embodiments, the first image and the second image may include at least an overlapping region. As disclosed herein, the terms 'first image' and 'second image' refers to successive (or adjacent) images associated with a scene, such that the first image and the second image comprises at least an overlapping region. An example illustrating the first image and the second image is illustrated and described in detail with reference to FIG. 6. It is noted that although in this embodiment, the second image succeeds the first image, it will be contemplated that in alternate embodiments, the first image may succeed the second image. Also, it will be contemplated that for the generation of a panorama image, a plurality of images may be input, and each of the plurality of image may be stitched with at least one of a succeeding image and a preceding image by utilizing the method disclosed herein.

At block 504, image features corresponding to each of the plurality of images are computed. For example, at block 504 of the method 500, at least one first feature associated with the first image and at least one second feature associated with the second image may be computed. In an example embodiment, the at least one first feature and the at least one second feature may be computed based on Harris corner detection method. In another example embodiment, the at least one first feature and the at least one second feature may be computed based on a corner detection method.

At block 506, a feature matching is performed between the at least one first feature and the at least one second feature to generate a plurality of matched features. For example, the first image may include image features that may match with corresponding image features associated with the second image.

At block 508, weights may be assigned to the at least one first feature and the at least one second feature based on a distance of the at least one first feature and the at least one second feature from a central portion of the corresponding one of the first image and the second image. As already discussed with reference to FIGS. 2 and 3, the weights are assigned to the at least one first feature and the at least one second feature based on a weighting function described by equation (1):

$$w_x^1 = 1 - |((x-c_x)/c_x)^n|$$

Based on the weighting function (1), the weight at the center of an image, for example, the first image and the second image is unity, and the weight decreases linearly or exponentially when a column wise distance from the central portion of the respective image is traversed.

At block 510, a plurality of matching weights is computed for the plurality of matched features based on the weights assigned to the at least one first feature and the at least one second feature. For example, if $w_i^1$ represents an $i^{th}$ feature associated with the first image, and $w_j^2$ represents a $j^{th}$ feature associated with the second image such that $i^{th}$ feature of the first image matches with the $j^{th}$ feature of the second image, then a weight associated with the matched feature between the $i^{th}$ feature of the first image and the $j^{th}$ feature of the second image may be determined based on the following expression:

$$w_{ij} = w_i^1 * w_j^2$$

In various embodiment, a set of matching features is determined from the plurality of matching features such that the set of matching features may be utilized for determining the transforms between the first image and the second image. In an example embodiment, the set of matching features may be determined based on a RANSAC method. In an example embodiment, the set of matching features may be determined by sorting the plurality of matching features in an order of the matching weights associated with each of the plurality of matching features, at block 512. For example, the plurality of matching features may be sorted in one of an increasing or decreasing order of matching weights. From the plurality of matching features, a set of matching features may be selected at block 514, such that the set of matching features includes matching features having a matching weight greater than a predetermined matching weight. For example, if K is the total number of matching features in the plurality of matching features, then about K/4 number of the matching features may be selected from the sorted plurality of matching features based on the matching weight thereof.

At block 516, random pairwise matching features may be selected from the set of matching features. A probable transform for each of the random pairwise matching features is computed, at block 518. In an example embodiment, the probable transform may be a similarity transform. In various other example embodiments, the probable transform may correspond to homographic transform.

In an embodiment, an inlier corresponding to each of the probable transform is determined at block 520. The term 'inlier' as used herein may refer to a set of points or data whose distribution is associated with a set of model parameters. At block 522, a total matching weight associated with each of the probable transform is computed for the determined inliers. As explained with reference to FIG. 2, the total matching weight may be computed based on the following expression:

$$W_t = \sum_{i,j} (w_i^1 * w_j^2)^2$$

At block 524, a transform corresponding to a maximum total matching weight is determined based on the computed total matching weight. In some embodiments, the transform corresponding to the maximum total matching weight is associated with a minimum distortion in the central portion of the overlap region between the first image and the second image. At block 526, a transformation of the first image and the second image is performed based on the determined transform to generate a panorama image. In some embodiments, the transformed first image and the transformed second image may be warped based on the determined transforms, and the panorama image is generated by stitching the plurality of warped images. In an example embodiment, stitching two warped images may include computing a seam between the warped images and blending the warped images along the seam.

To facilitate discussion of the method 500 of FIG. 5, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the method 500 are performed in an automated fashion. These operations involve substantially no interaction with the user. Other operations of the method 500 may be performed by in a manual fashion or semi-automatic fashion. These operations involve interaction with the user via one or more user interface presentations.

In some embodiments, the panorama image generated by weight based determination of transforms facilitates in minimizing the distortion at a central overlap region between the images. It should be noted that the methods, for example, the methods 400 and 500 in conjunction with devices, for example the device 100 may be applied for estimating transforms such as homography transform, affine transform, similarity transformation, and the like. It should also be noted that the disclosed methods and devices may be applied in conjunction with bundle adjustment technique, wherein initial homographies and/or similarity transforms may be computed based on weighting function, for example, the weighting function represented by equation (1) (Refer to FIG. 2). Also, the inliers may be computed based on the RANSAC method as described in FIGS. 2-5.

Various examples for generation of panorama images based on the methods 400 and 500 are described with reference to FIGS. 6-13b. Also, FIGS. 6-10 illustrate various examples of the panorama images generated based on the methods and device disclosed herein with reference to FIGS. 2-5.

Figure 6:
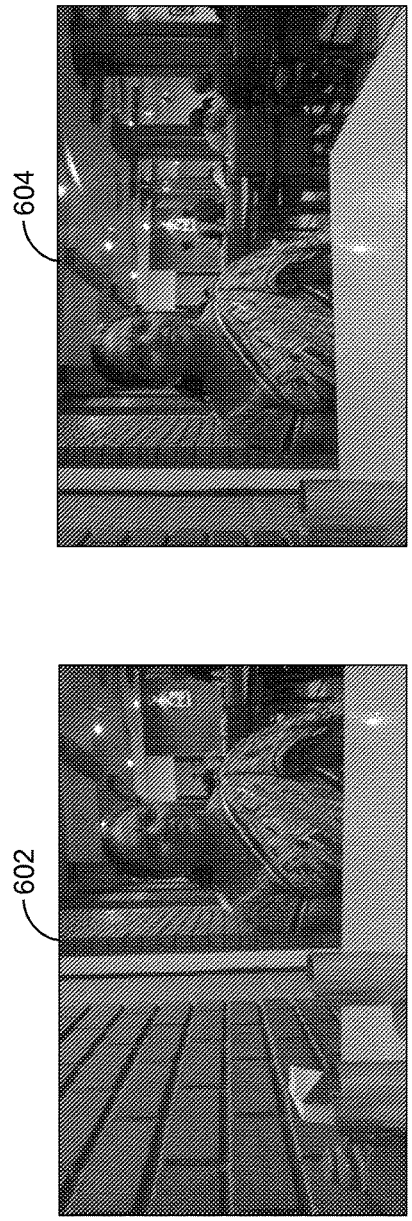
FIG. 6 illustrate a plurality of images that may be combined to generate panorama image, in accordance with an example embodiment.
Figure 7:
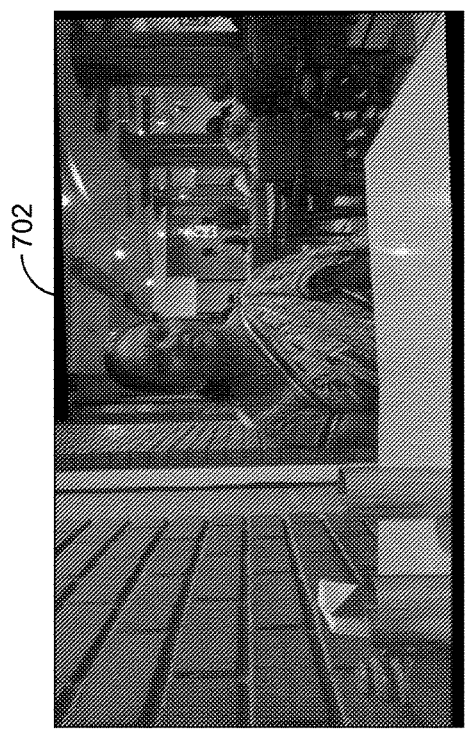
FIG. 7 illustrates a panorama image being generated in accordance with an example embodiment.

FIG. 6 illustrate a plurality of images, for example, a first image 602 and a second image 604 that may be combined to generate panorama image, in accordance with an example embodiment. In an example embodiment, FIG. 7 illustrates a panorama image 702 being generated by combining the first image 602 and the second image 604, in accordance with an example embodiment. In an embodiment, the panorama image 702 is generated by combining the first image 602 and the second image 604 by the methods, such as methods 400 and 500. As depicted in FIG. 7, the panorama image 702 (being generated based on the methods 400 and 500) includes minimum distortion in an overlap region between the first image 602 and the second image 604.

FIG. 8 illustrates a panorama image 802 being generated in accordance with another example embodiment. In an example embodiment, the panorama image 802 is generated by determining transforms based on a weighting function, as discussed with reference to FIGS. 2-5. As depicted in FIG. 11a, the panorama image 1102 being generated based on the methods 400 and 500 includes minimum distortion in an overlap region.

FIG. 9 illustrates distribution of inliers for a panorama image, for example, panorama images 902 being generated in accordance with an example embodiment. The panorama image 902 is an example of the panorama image 802 (see FIG. 8). The panorama image 902 is generated by performing weight based transforming on the images, as discussed with reference to FIGS. 2-5. As illustrated in FIG. 9, the distribution of inliers (marked as 904 shows that the inliers associated with the panorama image 902 are concentrated near the center of the image and penalized at the ends of the image.

FIG. 10 illustrate error distribution a panorama image, for example, a panorama image 1002 in accordance with an example embodiment. The panorama image 1002 is generated by performing weight based transforming on the images, and thereafter generating a seam, for example a seam 1004 (as discussed with reference to FIGS. 2-5). As illustrated in FIG. 10, the error associated with the seam 1004 of the panorama image 1002 is less in the seam region, i.e. the area in close proximity to the center of the overlap region, and hence the seam 1004 may be chosen in this region. The error increases as the panorama image 1002 is traversed horizontally from the seam 1004 in both the directions, for example, in the regions marked as 1006. It is noted that the error is represented by the blurred images of objects. Moreover, the error reduction and therefore the seam 1004 of the panorama image 1002 is relatively concentrated at the central portion of the overlapping region.

Without in any way limiting the scope, interpretation, or application of the claims appearing below, a technical effect of one or more of the example embodiments disclosed herein is to generate panorama images. The disclosed embodiments avoids various disadvantages such as portions of error, for example, disturbance and noise, stretching of the end portions, appearance of curved lines, distortion of the seam, and the like that are encountered during the generation of panorama images. For example, various embodiments provide a mechanism for determining/estimating transforms in a manner that the distortion in the panorama image is minimized, thereby generating a high quality panorama image. For instance, various computation involved in generating panorama images includes utilization of features associated with higher weights only. In some embodiments, the weights are assigned to various features of the images based on a distance of the features from a central portion of the image. Accordingly, those features are utilized for estimating transform that are associated with higher weights. In other words, the features closer to the central portion of the image are utilized for estimating transforms, and accordingly the panorama image generated based on such transforms provide minimum distortion, particularly, in the central portion of the overlapping region between the images. In some embodiments, the disclosed methods and systems may be utilized as a standalone and low complexity technique for generating panorama images without the need of manifold projections. However, the disclosed methods and systems may be combined with the manifold projection method for generating panorama images with minimal distortion.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
    assigning, by an image processor, weights to at least one first feature and at least one second feature, the at least one first feature being associated with a first image and the at least one second feature being associated with a second image, the weights being assigned based on a distance of the at least one first feature and the at least one second feature from a center of an overlapping portion of the first image and the second image, wherein the weights decrease exponentially from the center of the overlapping portion;
    registering, by the image processor, the first image and the second image based at least on the assigned weights to determine transforms between the first image and the second image, wherein features closer to the center of the overlapping portion of the first image and the second image are preferentially used for determining the transforms; and
    transforming, by the image processor, the first image and the second image based on the determined transform.

2. The method as claimed in claim 1, wherein registering at least the first image and the second image comprises:
    performing feature matching between the at least one first feature and the at least one second feature to generate a plurality of matching features; and
    computing a plurality of matching weights for the plurality of matching features based on the weights assigned to the at least one first feature and the at least one second feature.

3. The method as claimed in claim 2 further comprising:
    estimating a plurality of transforms between a set of matching features of the plurality of matching features, the set of matching features being selected from the plurality of matching features based on the plurality of matching weights; and
    selecting a transform of the plurality of transforms based on a total matching weight associated with the transform, the total matching weight of the transform being determined based on a plurality of inliers associated with the transform.

4. The method as claimed in claim 1, further comprising computing the at least one first feature and the at least one second feature prior to assigning weights to the at least one first feature and the at least one second feature.

5. The method as claimed in claim 1, further comprising determining a distance of the at least one first feature from a central portion of the first image, and determining a distance of the at least one second feature from a central portion of the second image, prior to assigning weights to the at least one first feature and the at least one second feature.

6. The method as claimed in claim 3, wherein the set of matching features is selected from the plurality of matching features by:
   sorting the plurality of matching features in an order of the matching weights associated with each of the plurality of matching features; and
   selecting the matching features of the plurality of matching features that have a matching weight greater than a predetermined matching weight as the set of matching features.

7. The method as claimed in claim 6, wherein estimating the plurality of transforms from the set of matching features comprises:
   selecting random pairwise matching features from the set of matching features;
   computing the total matching weight for each of the selected random pairwise matching features; and
   determining a transform corresponding to a maximum total matching weight from the computed total matching weight, the determined transform being utilized for panorama generation.

8. The method as claimed in claim 6, wherein the total matching weight is determined by:
   computing a probable transform for each of the random pairwise matching features;
   determining an inlier corresponding to each of the probable transform; and
   computing the total matching weight associated with each of the probable transforms for the determined inlier.

9. An apparatus comprising:
   at least one processor; and
   at least one memory comprising computer program code, the at least one memory and the computer program code configured to, with the at least one processor, cause the apparatus to at least perform:
      assign weights to at least one first feature and at least one second feature, the at least one first feature being associated with a first image and the at least one second feature being associated with a second image, the weights being assigned based on a distance of the at least one first feature and the at least one second feature from a center of an overlapping portion of the first image and the second image, wherein the weights decrease exponentially from the center of the overlapping portion;
      register the first image and the second image based at least on the assigned weights to determine transforms between the first image and the second image, wherein features closer to the center of the overlapping portion of the first image and the second image are preferentially used for determining the transforms; and
      transform the first image and the second image based on the determined transform.

10. The apparatus as claimed in claim 9, wherein, to register at least the first image and the second image, the apparatus is further caused, at least in part to:
    perform feature matching between the at least one first feature and the at least one second feature to generate a plurality of matching features; and
    compute a plurality of matching weights for the plurality of matching features based on the weights assigned to the at least one first feature and the at least one second feature.

11. The apparatus as claimed in claim 10, wherein the apparatus is further caused, at least in part to perform:
    estimate a plurality of transforms between a set of matching features of the plurality of matching features, the set of matching features being selected from the plurality of matching features based on the plurality of matching weights; and
    select a transform of the plurality of transforms based on a total matching weight associated with the transform, the total matching weight of the transform being determined based on a plurality of inliers associated with the transform.

12. The apparatus as claimed in claim 9, wherein the apparatus is further caused, at least in part to compute the at least one first feature and the at least one second feature prior to assigning weights to the at least one first feature and the at least one second feature.

13. The apparatus as claimed in claim 9, wherein the apparatus is further caused, at least in part to determine a distance of the at least one first feature from a central portion of the first image, and determine a distance of the at least one second feature from a central portion of the second image, prior to assigning weights to the at least one first feature and the at least one second feature.

14. The apparatus as claimed in claim 11, wherein, to select the set of matching features from the plurality of matching features, the apparatus is further caused, at least in part to:
    sort the plurality of matching features in an order of the matching weights associated with each of the plurality of matching features; and
    select the matching features of the plurality of matching features that have a matching weight greater than a predetermined matching weight as the set of matching features.

15. The apparatus as claimed in claim 14, wherein, to estimate the plurality of transforms from the set of matching features, the apparatus is further caused, at least in part to:
    select random pairwise matching features from the set of matching features;
    compute the total matching weight for each of the selected random pairwise matching features; and
    determine a transform corresponding to a maximum total matching weight from the computed total matching weight, the determined transform being utilized for panorama generation.

16. The apparatus as claimed in claim 13, wherein, to determine the total matching weight, the apparatus is further caused, at least in part to:
    compute a probable transform for each of the random pairwise matching features;
    determine an inlier corresponding to each of the probable transform; and
    compute the total matching weight associated with each of the probable transforms for the determined inlier.

17. A computer program product comprising at least one non-transitory computer-readable storage medium, the computer-readable storage medium comprising a set of instructions, which, when executed by one or more processors, cause an apparatus at least to perform:
    assign weights to at least one first feature and at least one second feature, the at least one first feature being associated with a first image and the at least one second feature being associated with a second image, the weights being assigned based on a distance of the at least one first feature and the at least one second feature from a center of an overlapping portion of the first image and the second image, wherein the weight sdecrease exponentially from the center of the overlapping portion;

register the first image and the second image based at least on the assigned weights to determine transforms between the first image and the second image, wherein features closer to the center of the overlapping portion of the first image and the second image are preferentially used for determining the transforms; and transform the first image and the second image based on the determined transform.

18. The computer program product as claimed in claim 17, wherein, to register at least the first image and the second image, the apparatus is further caused, at least in part to:

perform feature matching between the at least one first feature and the at least one second feature to generate a plurality of matching features; and compute a plurality of matching weights for the plurality of matching features based on the weights assigned to the at least one first feature and the at least one second feature.

19. The computer program product as claimed in claim 18, wherein the apparatus is further caused, at least in part to perform:

estimate a plurality of transforms between a set of matching features of the plurality of matching features, the set of matching features being selected from the plurality of matching features based on the plurality of matching weights; and select a transform of the plurality of transforms based on a total matching weight associated with the transform, the total matching weight of the transform being determined based on a plurality of inliers associated with the transform.

20. The computer program product as claimed in claim 17, wherein the apparatus is further caused, at least in part to compute the at least one first feature and the at least one second feature prior to assigning weights to the at least one first feature and the at least one second feature.

21. The computer program product as claimed in claim 17, wherein the apparatus is further caused, at least in part to determine a distance of the at least one first feature from a central portion of the first image, and determine a distance of the at least one second feature from a central portion of the second image, prior to assigning weights to the at least one first feature and the at least one second feature.

* * * * *

UNITED STATES PATENT AND TRADEMARK OFFICE
CERTIFICATE OF CORRECTION

PATENT NO.        : 9,619,863 B2                              Page 1 of 1
APPLICATION NO.   : 14/395962
DATED             : April 11, 2017
INVENTOR(S)       : Veldandi et al.

It is certified that error appears in the above-identified patent and that said Letters Patent is hereby corrected as shown below:

On the Title Page

Column 1,
Item (72), In "Inventors", Line 1, "Veldandi Muninder" should read --Muninder Veldandi--.

In the Claims

Column 23,
Lines 5-6, "weight sdecrease" should read --weights decrease--.

Signed and Sealed this
Second Day of January, 2018

Joseph Matal
*Performing the Functions and Duties of the*
*Under Secretary of Commerce for Intellectual Property and*
*Director of the United States Patent and Trademark Office*